United States Patent
Sugimura et al.

(10) Patent No.: US 11,745,290 B2
(45) Date of Patent: Sep. 5, 2023

(54) METAL MEMBER-WELDED STRUCTURE AND METHOD OF MANUFACTURING METAL MEMBER-WELDED STRUCTURE

(71) Applicants: Sumitomo Electric Industries, Ltd., Osaka (JP); AutoNetworks Technologies, Ltd, Yokkaichi (JP); Sumitomo Wiring Systems, Ltd., Yokkaichi (JP)

(72) Inventors: Koki Sugimura, Osaka (JP); Tetsuya Kuwabara, Osaka (JP); Kazuhiro Goto, Osaka (JP); Hiroki Hirai, Yokkaichi (JP); Tetsuji Tanaka, Yokkaichi (JP); Junichi Ono, Yokkaichi (JP); Takuji Otsuka, Yokkaichi (JP); Kenji Miyamoto, Yokkaichi (JP); Osamu Nakayama, Yokkaichi (JP); Kazuaki Hamada, Yokkaichi (JP); Kazuhiro Washio, Yokkaichi (JP)

(73) Assignees: Sumitomo Electrical Industries, Ltd., Osaka (JP); AutoNetworks Technologies, Ltd, Yokkaichi (JP); Sumitomo Wiring Systems, Ltd., Yokkaichi (JP)

(*) Notice: Subject to any disclaimer, the term of this patent is extended or adjusted under 35 U.S.C. 154(b) by 177 days.

(21) Appl. No.: 17/272,912

(22) PCT Filed: Jul. 24, 2019

(86) PCT No.: PCT/JP2019/029062
§ 371 (c)(1),
(2) Date: Mar. 2, 2021

(87) PCT Pub. No.: WO2020/049885
PCT Pub. Date: Mar. 12, 2020

(65) Prior Publication Data
US 2021/0339339 A1    Nov. 4, 2021

(30) Foreign Application Priority Data

Sep. 3, 2018 (JP) ................................ 2018-164851

(51) Int. Cl.
*B23K 26/323* (2014.01)
*B23K 26/244* (2014.01)
(Continued)

(52) U.S. Cl.
CPC .......... *B23K 26/323* (2015.10); *B23K 26/244* (2015.10); *B23K 26/60* (2015.10);
(Continued)

(58) Field of Classification Search
None
See application file for complete search history.

(56) References Cited

U.S. PATENT DOCUMENTS

2011/0095003 A1* 4/2011 Sakurai ............ B23K 26/0617
219/121.64
2015/0001187 A1* 1/2015 Spinella ................ B23K 11/20
219/91.2
(Continued)

FOREIGN PATENT DOCUMENTS

| JP | 2006-231343 A | 9/2006 |
|---|---|---|
| JP | 2014-097526 A | 5/2014 |
| WO | 2015/159503 A1 | 10/2015 |

*Primary Examiner* — Daniel J. Schleis
(74) *Attorney, Agent, or Firm* — McCarter & English, LLP; Michael A. Sartori

(57) ABSTRACT

A metal member-welded structure includes: a Cu member; an Al member; and a welded portion formed by melting and solidifying each of materials of the Cu member and the Al member. The Cu member includes a Cu-based material containing Cu as a main component. The Al member includes an Al-based material containing Al as a main component and a plating layer that covers a side of the Al-based material, the side being close to a surface of the Cu (Continued)

member. The welded portion includes a sea-island structure in a vicinity of the surface of the Cu member. The sea-island structure includes: a plurality of island portions containing pure Al, and a sea portion interposed among the island portions. The sea portion has a eutectic structure having: a phase of an intermetallic compound of Cu and Al; and a phase of pure Al.

11 Claims, 4 Drawing Sheets

(51) Int. Cl.
  *B23K 26/60* (2014.01)
  *C22C 21/02* (2006.01)
  *C22C 21/00* (2006.01)
  *B23K 103/10* (2006.01)
  *B23K 103/12* (2006.01)
(52) U.S. Cl.
  CPC .............. *C22C 21/00* (2013.01); *C22C 21/02* (2013.01); *B23K 2103/10* (2018.08); *B23K 2103/12* (2018.08)

(56) References Cited

U.S. PATENT DOCUMENTS

2016/0114429 A1\* 4/2016 Shioga ................. B23K 26/323
  219/121.65
2017/0341144 A1 11/2017 Pelaprat et al.

\* cited by examiner

US 11,745,290 B2

METAL MEMBER-WELDED STRUCTURE AND METHOD OF MANUFACTURING METAL MEMBER-WELDED STRUCTURE

TECHNICAL FIELD

The present disclosure relates to a metal member-welded structure and a method of manufacturing the metal member-welded structure.

The present application claims priority based on Japanese Patent Application No. 2018-164851 filed on Sep. 3, 2018, the entire contents of which are incorporated herein by reference.

BACKGROUND ART

As a metal member-welded structure formed by welding a Cu member and an Al member, for example, a structure formed by connecting different types of metals in PTL 1 has been known. This structure formed by connecting different types of metals is manufactured by stacking a first metal portion made of copper and a second metal portion made of aluminum on one another, which are then joined to each other by pressurization and heating.

CITATION LIST

Patent Literature

PTL 1: Japanese Patent Laying Open No. 2014-97526

SUMMARY OF INVENTION

A metal member-welded structure according to the present disclosure includes:
 a Cu member;
 an Al member; and
 a welded portion formed by melting and solidifying each of materials of the Cu member and the Al member, wherein
 the Cu member includes a Cu-based material containing Cu as a main component,
 the Al member includes an Al-based material containing Al as a main component and a plating layer that covers a surface of the Al-based material, the surface being close to a surface of the Cu member,
 the welded portion includes a sea-island structure in a vicinity of the surface of the Cu member,
 the sea-island structure includes
  a plurality of island portions containing pure Al, and
  a sea portion interposed among the island portions, and
 the sea portion has a eutectic structure having
  a phase of an intermetallic compound of Cu and Al, and
  a phase of pure Al.

A method of manufacturing a metal member-welded structure according to the present disclosure includes:
 preparing a Cu member and an Al member; and
 welding the Cu member and the Al member, wherein
 in the preparing,
  the Cu member includes a Cu-based material containing Cu as a main component, and
  the Al member includes an Al-based material containing Al as a main component and a plating layer that covers the Al-based material,
 in the welding,
  laser is applied from an Al member side to the Cu member in a state where the Cu member and the plating layer of the Al member are disposed to face each other, and
 a laser applying condition satisfies
  an output of 550 W or more, and
  a scanning rate of 10 mm/sec or more.

DETAILED DESCRIPTION

Figure 1:
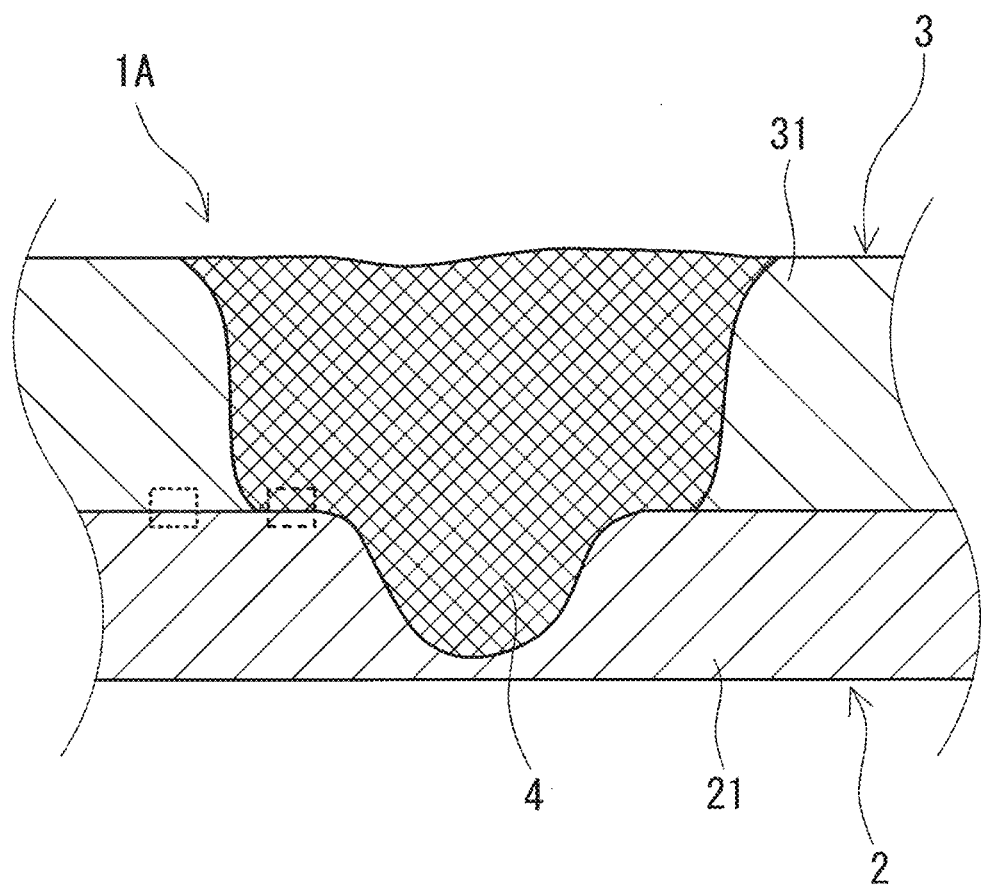
FIG. 1 a cross-sectional view showing a schematic metal member-welded structure according to the first embodiment.

Problem to be Solved by the Present Disclosure

It is desired to further improve the joining strength between a Cu member and an Al member in a metal member-welded structure.

Thus, an object of the present disclosure is to provide a metal member-welded structure with excellent joining strength between a Cu member and an Al member.

Another object of the present disclosure is to provide a method of manufacturing a metal member-welded structure, by which a metal member-welded structure with excellent joining strength between a Cu member and an Al member can be manufactured.

Advantageous Effect of the Present Disclosure

The metal member-welded structure according to the present disclosure is excellent in joining strength between the Cu member and the Al member.

The method of manufacturing a metal member-welded structure according to the present disclosure allows manufacturing of a metal member-welded structure with excellent joining strength between the Cu member and the Al member.

Description of Embodiment of the Present Disclosure

The embodiments of the present disclosure will be first listed below for explanation.

(1) A metal member-welded structure according to one embodiment of the present disclosure includes:

a Cu member;
an Al member; and
a welded portion formed by melting and solidifying each of materials of the Cu member and the Al member, wherein
the Cu member includes a Cu-based material containing Cu as a main component,
the Al member includes an Al-based material containing Al as a main component and a plating layer that covers a side of the Al-based material, the side being close to a surface of the Cu member,
the welded portion includes a sea-island structure in a vicinity of the surface of the Cu member,
the sea-island structure includes
a plurality of island portions containing pure Al, and
a sea portion interposed among the island portions, and
the sea portion has a eutectic structure having
a phase of an intermetallic compound of Cu and Al, and
a phase of pure Al.

The metal member-welded structure is excellent in joining strength between the Cu member and the Al member. A plurality of island portions exist in an area of the welded portion in the vicinity of the surface of the Cu member. Since the island portions contain pure Al, the island portions are relatively high in ductility. This is because the ductility in the vicinity of the surface of the Cu member tends to be high. This is also because the plurality of island portions are distributed in an area of the welded portion in the vicinity of the surface of the Cu member, so that the stress acting on the area in the vicinity of the surface is readily distributed. This is also because the plurality of island portions exist in an area of the welded portion in the vicinity of the surface of the Cu member, so that cracks are less likely to linearly propagate.

(2) As one embodiment of the metal member-welded structure,
the sea-island structure includes a coarse-dense structure,
the coarse-dense structure includes
a dense region including the island portions that are small in size and large in number, and
a coarse region including the island portions that are large in size and small in number,
the dense region is provided on a side close to the surface of the Cu member, and
the coarse region is provided on a side opposite to the surface of the Cu member.

The metal member-welded structure is more excellent in joining strength between the Cu member and the Al member. This is because a region where minute island portions densely exist is provided in the sea-island structure on the side close to the surface of the Cu member, so that the ductility in an area of the welded portion in the vicinity of the surface of the Cu member tends to be high. This is also because the stress acting on the area of the welded portion in the vicinity of the surface of the Cu member is readily distributed. Further, this is also because a region including dense island portions is provided, so that cracks are less likely to linearly propagate. In the metal member-welded structure, the sea-island structure has a region including coarse island portions, so that an excessive decrease in conductivity is readily suppressed.

(3) As one embodiment of the metal member-welded structure, the sea portion has a thickness of 5 μm or less.

The metal member-welded structure is more excellent in joining strength between the Cu member and the Al member. In the above-described configuration, the sea portion is relatively thin and the phase of a fragile intermetallic compound is relatively small in size. Accordingly, the above-described configuration can suppress a decrease in joining strength at the interface between the surface of the Cu member and the welded portion.

(4) As one embodiment of the metal member-welded structure, a distance between the island portions is 10 μm or less.

The metal member-welded structure is more excellent in joining strength between the Cu member and the Al member. This is because the distance between the island portions is not excessively large, so that cracks are less likely to linearly propagate.

(5) As one embodiment of the metal member-welded structure, the island portions each have a size of 1 μm² or more and 20 μm² or less.

When the island portions each have a size of 1 μm² or more, the ductility in the area of the welded portion in the vicinity of the surface of the Cu member tends to be high. The island portions each having a size of 20 μm² or less are not excessively large, and the distance between the island portions is less likely to be large.

(6) As one embodiment of the metal member-welded structure, the sea-island structure has a thickness of 3 μm or more.

When the sea-island structure has a thickness of 3 μm or more, further excellent joining strength between the Cu member and the Al member is achieved. This is because the stress acting on the area of the welded portion in the vicinity of the surface of the Cu member is readily distributed.

(7) As one embodiment of the metal member-welded structure,
the Al-based material contains, as an additional element, one or more elements selected from: 1 mass % or more and 17 mass % or less of Si; 0.05 mass % or more and 2.5 mass % or less of Fe; 0.05 mass % or more and 2.5 mass % or less of Mn; and 0.1 mass % or more and 1.0 mass % or less of Mg.

When the contents of the additional elements are equal to or greater than their respective lower limit values, the joining strength between the Cu member and the Al member tends to be higher than that of pure Al. When the contents of the additional elements are equal to or less than their respective upper limit values, an excessive decrease in conductivity can be suppressed.

(8) As one embodiment of the metal member-welded structure, the plating layer has a single-layer structure of an Ni plating layer.

In the metal member-welded structure, the joining strength between the Cu member and the Al member is readily increased. This is because the plating layer is formed as an Ni plating layer with a high melting point, so that the sea-island structure is readily formed. This can suppress formation of a layered thick intermetallic compound or an island-shaped large intermetallic compound in an area of the welded portion in the vicinity of the surface of the Cu member. Furthermore, in the single-layer structure, a plating layer is more readily formed than in a stack structure, which will be described later.

(9) As one embodiment of the metal member-welded structure, the plating layer has a stack structure formed by sequentially stacking an Ni plating layer and an Sn plating layer from an Al-based material side.

In the metal member-welded structure, the joining strength between the Cu member and the Al member is readily increased. This is because the plating layer has an Ni plating layer with a high melting point, so that the above-mentioned sea-island structure is readily formed. This is also because the plating layer has an Sn plating layer with a low melting point on the surface of the Ni plating layer, so that the Sn plating layer is more likely to function as a joining material.

(10) As one embodiment of the metal member-welded structure, the Cu member includes a plating layer that covers a surface of the Cu-based material.

The metal member-welded structure is excellent in joining strength between the Cu member and the Al member even when the Cu member includes a plating layer.

(11) As one embodiment of the metal member-welded structure, the welded portion penetrates through the Cu member.

In the metal member-welded structure, it can be readily distinguished that the Cu member and the Al member are welded. This is because a welding mark is formed on a side of the Cu member opposite to the Al member. Furthermore, the metal member-welded structure is excellent in joining strength comparable to the case where the Cu member is partially melted.

(12) A method of manufacturing a metal member-welded structure according to one embodiment of the present disclosure, the method including:

preparing a Cu member and an Al member; and
welding the Cu member and the Al member, wherein
in the preparing,
the Cu member includes a Cu-based material containing Cu as a main component, and
the Al member includes an Al-based material containing Al as a main component and a plating layer that covers the Al-based material,
in the welding,
laser is applied from an Al member side to the Cu member in a state where the Cu member and the plating layer of the Al member are disposed to face each other, and
a laser applying condition satisfies
an output of 550 W or more, and
a scanning rate of 10 mm/sec or more.

The method of manufacturing a metal member-welded structure allows manufacturing of a metal member-welded structure that is excellent in joining strength between the Cu member and the Al member. This is because the Al member includes a plating layer and the laser output and the laser scanning rate satisfy their respective ranges, and thereby, the above-mentioned sea-island structure facilitating higher ductility and stress alleviation can be formed in an area of the welded portion in the vicinity of the surface of the Cu member. This is also because formation of such a sea-island structure can suppress formation of a layered thick intermetallic compound or an island-shaped large intermetallic compound in an area of the welded portion in the vicinity of the surface of the Cu member. This intermetallic compound is fragile $Al_2Cu$. A larger intermetallic compound may decrease the joining strength between the Cu member and the Al member. However, as formation of a large intermetallic compound can be suppressed, a decrease in joining strength between the Cu member and the Al member can be suppressed.

According to the method of manufacturing a metal member-welded structure, the laser output is set at 550 W or more, so that the surface of the Cu member can be melted to thereby allow welding between the Cu member and the Al member.

According to the method of manufacturing a metal member-welded structure, the laser scanning rate is set at 10 mm/sec or more, and thereby, the productivity can be improved. This is because the scanning rate is not excessively low, and thus, the time required for welding between the Cu member and the Al member is not excessively long.

(13) As one embodiment of the method of manufacturing a metal member-welded structure, the laser is fiber laser.

According to the method of manufacturing a metal member-welded structure, the Cu member and the Al member are readily welded to each other.

(14) As one embodiment of the method of manufacturing a metal member-welded structure, the laser is applied to allow penetration through the Cu member.

The method of manufacturing a metal member-welded structure allows manufacturing of a metal member-welded structure, for which it can be readily distinguished that the Cu member and the Al member are welded to each other. This is because a welding mark is formed on the side of the Cu member opposite to the Al member. It has been considered that melting of Cu so as to allow penetration through the Cu member leads to formation of a fragile intermetallic compound, thereby decreasing the joining strength. However, when laser is applied on a specific applying condition to an Al member prepared to have a plating layer, the size of a fragile intermetallic compound tends to be small. Thus, a decrease in joining strength can be suppressed. Therefore, the above-described method of manufacturing a metal member-welded structure allows manufacturing of a metal member-welded structure having joining strength comparable to that in the case where the Cu member is partially melted.

(15) As one embodiment of the method of manufacturing a metal member-welded structure, the Cu member has a plating layer that covers a surface of the Cu-based material, and in the welding, the plating layer of the Cu member and the plating layer of the Al member are welded in a state where the plating layer of the Cu member and the plating layer of the Al member are disposed to face each other.

The method of manufacturing a metal member-welded structure allows manufacturing of a metal member-welded structure with excellent joining strength between the Cu member and the Al member even when the Cu member has a plating layer.

Details of Embodiments of the Present Disclosure

The details of the embodiments of the present disclosure will be described below. The embodiments will be described sequentially in the order of: a metal member-welded structure, and a method of manufacturing a metal member-welded structure.

First Embodiment

[Metal Member-Welded Structure]

Figure 2:
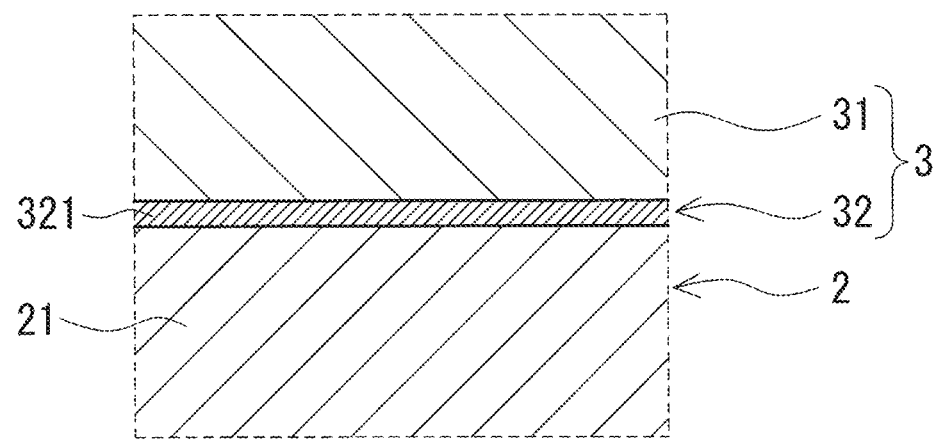
FIG. 2 is a cross-sectional view showing an example of an interface between a Cu member and an Al member and a vicinity of the interface in the metal member-welded structure according to the first embodiment.
Figure 3:
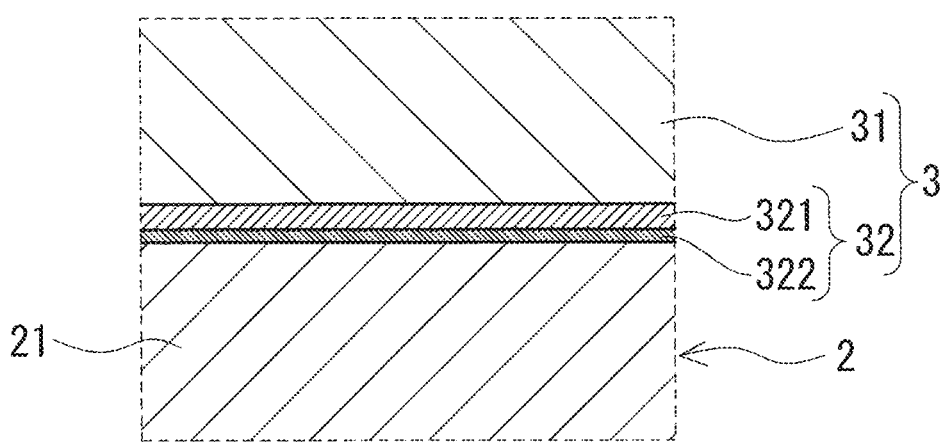
FIG. 3 is a cross-sectional view showing another example of the interface between the Cu member and the Al member and the vicinity of the interface in the metal member-welded structure according to the first embodiment.
Figure 4:
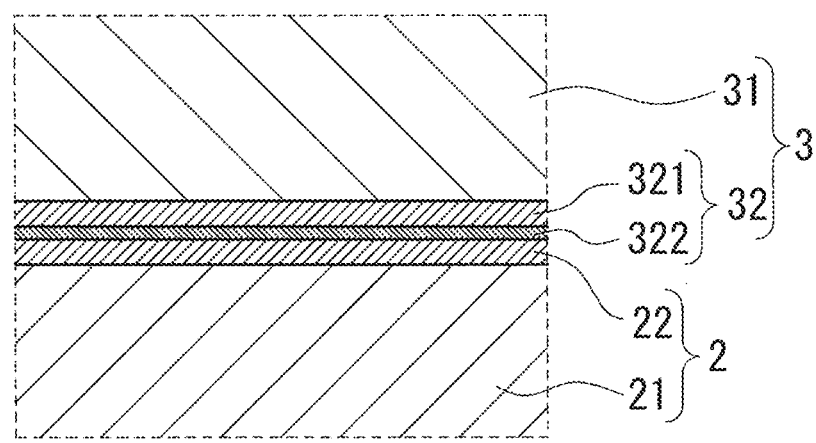
FIG. 4 is a cross-sectional view showing another example of the interface between the Cu member and the Al member and the vicinity of the interface in the metal member-welded structure according to the first embodiment.
Figure 5:
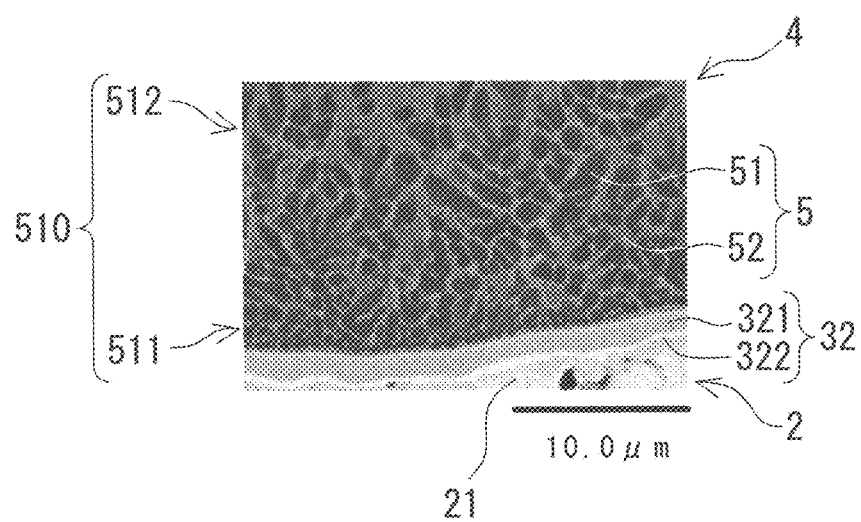
FIG. 5 is a microphotograph showing, in an enlarged manner, an area of a welded portion in the vicinity of a surface of the Cu member in the metal member-welded structure according to the first embodiment.

Herein, a metal member-welded structure 1A according to the first embodiment will be described with reference to FIGS. 1 to 5. Metal member-welded structure 1A includes a Cu member 2, an Al member 3, and a welded portion 4 through which Cu member 2 and Al member 3 are joined (FIG. 1). One characteristic feature of metal member-welded structure 1A is that welded portion 4 includes a sea-island structure 5 having a specific structure (FIG. 5). Each of the configurations will be hereinafter described in detail. In the following description, the side of Cu member 2 close to Al member 3 is defined as a front side (the upper side in FIG. 1) and the side opposite to the front side is defined as a back side (the lower side in FIG. 1). In the following description, the side of Al member 3 close to Cu member 2 is defined as a back side (the lower side in FIG. 1) and the side opposite to the back side is defined as a front side (the upper side in FIG. 1). In the following description, this front-back direction is defined as a thickness direction. FIGS. 2 to 4 each show, in an enlarged manner, a rectangular portion surrounded by a dotted bold line in FIG. 1. In other words, FIGS. 2 to 4 each show, in an enlarged manner, the interface between Cu member 2 and Al member 3 and the vicinity of the interface. FIG. 5 shows, in an enlarged manner, a rectangular portion surrounded by a dashed bold line in FIG. 1. In other words, FIG. 5 is a microphotograph showing, in an enlarged manner, an area of welded portion 4 in the vicinity of the surface of Cu member 2. In the accompanying drawings, the same reference characters indicate the components having the same names.

(Cu Member)

Cu member 2 includes a Cu-based material 21 (FIGS. 1 to 5). Cu member 2 is formed only of Cu-based material 21 (FIGS. 1 to 3 and 5). Cu member 2 may be formed of a covering member including Cu-based material 21 and a plating layer 22 that will be described later (FIG. 4).

<Cu-Based Material>

Cu-based material 21 contains Cu as a main component, which means pure Cu and a Cu-based alloy. Cu-based material 21 is allowed to contain inevitable impurities. Additional elements of the Cu-based alloy are one or more elements selected from Si (silicon), Fe (iron), Mn (manganese), Ti (titanium), Mg (magnesium), Sn (tin), Ag (silver), In (indium), Sr (strontium), Zn (zinc), Ni (nickel), Al (aluminum), and P (phosphorus), for example. The contents of these additional elements can be selected as appropriate to fall within ranges in which conductivity does not excessively decrease. The total content of the additional elements is preferably 0.001 mass % or more and 0.1 mass % or less, further preferably 0.005 mass % or more and 0.07 mass % or less, and particularly preferably 0.01 mass % or more and 0.05 mass % or less, for example. In this case, Cu-based material 21 is pure Cu.

The shape of Cu-based material 21 can be selected as appropriate. Cu-based material 21 representatively has a plate shape. The thickness of Cu-based material 21 can be selected as appropriate. For example, the thickness of Cu-based material 21 is 0.15 mm or more and 0.6 mm or less, and further 0.25 mm or more and 0.5 mm or less, and particularly 0.35 mm or more and 0.4 mm or less. The thickness of Cu-based material 21 is defined as a thickness of Cu-based material 21 excluding welded portion 4. The same is also applied to the thickness of plating layer 22 described later (FIG. 4) and the thicknesses of an Al-based material 31 and a plating layer 32 of Al member 3.

<Plating Layer>

Plating layer 22 covers the surface of Cu-based material 21 (FIG. 4). In other words, plating layer 22 covers the surface of Cu-based material 21 on the side close to Al member 3. Plating layer 22 is representatively an Ni plating layer. The thickness of plating layer 22 can be selected as appropriate. For example, the thickness of plating layer 22 is 1 μm or more and 10 μm or less, and further 1.5 μm or more and 8 μm or less, and particularly 2 μm or more and 6 μm or less.

(Al Member)

Al member 3 is a covering member including Al-based material 31 and plating layer 32. Plating layer 32 covers the back surface of Al-based material 31. In other words, plating layer 32 covers the surface of Al-based material 31 on the side close to Cu member 2.

<Al-Based Material>

Al-based material 31 contains Al as a main component, which means pure Al and an Al-based alloy. Al-based material 31 is allowed to contain inevitable impurities. Additional elements of the Al-based alloy are one or more elements selected from Si, Fe, Mn, and Mg.

The content of Si is, for example, 1 mass % or more and 17 mass % or less, and further 2.5 mass % or more and 15 mass % or less, and particularly 4 mass % or more and 13 mass % or less. The content of Fe is, for example, 0.05 mass % or more and 2.5 mass % or less, and further 0.25 mass % or more and 2 mass % or less, and particularly 0.5 mass % or more and 1.5 mass % or less. The content of Mn is, for example, 0.05 mass % or more and 2.5 mass % or less, and further 0.25 mass % or more and 2 mass % or less, and particularly 0.5 mass % or more and 1.5 mass % or less. The content of Mg is, for example, 0.1 mass % or more and 1.0 mass % or less, and further 0.2 mass % or more and 0.9 mass % or less, and particularly 0.3 mass % or more and 0.8 mass % or less. Since the contents of these additional elements are equal to or greater than their respective lower limit values, the joining strength between Cu member 2 and Al member 3 tends to be higher than that of pure Al. Since the contents of these additional elements are equal to or less than their respective upper limit values, an excessive decrease in conductivity can be suppressed. In this case, Al-based material 31 is made of pure Al. The manner in which Al-based material 31 is made of an Al-based alloy will be described in the second embodiment as set forth below.

The shape of Al-based material 31 can be selected as appropriate. Al-based material 31 representatively has a plate shape like Cu member 2. The thickness of Al-based material 31 can be selected as appropriate. The thickness of Al-based material 31 is, for example, 0.2 mm or more and 1.2 mm or less, and further 0.25 mm or more and 0.9 mm or less, and particularly 0.3 mm or more and 0.6 mm or less.

<Plating Layer>

Plating layer 32 may have a single-layer structure or a stack structure, for example. The single-layer structure may be a structure formed of an Ni plating layer 321 (FIG. 2). The stack structure may be a structure formed by sequentially stacking an Ni plating layer 321 and an Sn plating layer 322 in this order from the Al-based material 31 side (FIGS. 3 to 5). The thickness of plating layer 32 can be selected as appropriate. For example, when plating layer 32 has a single-layer structure, the thickness of Ni plating layer 321 is 1 μm or more and 10 μm or less, and further 1.5 μm or more and 8 μm or less, and particularly 2 μm or more and 6 μm or less. When plating layer 32 has a stack structure, the thickness of each of Ni plating layer 321 and Sn plating layer 322 is 1 μm or more and 10 μm or less, and further 1.5 μm or more and 8 μm or less, and particularly 2 μm or more and 6 μm or less. Ni plating layer 321 may contain an additional element depending on the method of forming Ni plating layer 321, which will be described later. Examples of the additional element may be phosphorus (P) and the like. The content of the additional element is relatively small.

(Welded Portion)

Welded portion 4 serves to join Cu member 2 and Al member 3 and is formed by melting and solidifying the materials of Cu member 2 and Al member 3. In other words, the main constituent elements of welded portion 4 are Al and Cu. The region in which welded portion 4 is formed in the thickness direction of metal member-welded structure 1A is defined as a region extending from the surface of Al member 3 to at least a part of Cu member 2. In other words, welded portion 4 penetrates through Al member 3 between its front surface and its back surface. It is preferable that this region in which welded portion 4 is formed extends to the back surface of Cu member 2. In other words, it is preferable that welded portion 4 penetrates through Cu member 2 between its front surface and its back surface. When welded portion 4 penetrates through Cu member 2, it can readily be distinguished that Cu member 2 and Al member 3 are welded to each other. This is because a welding mark is formed on the back surface of Cu member 2.

Figure 6:
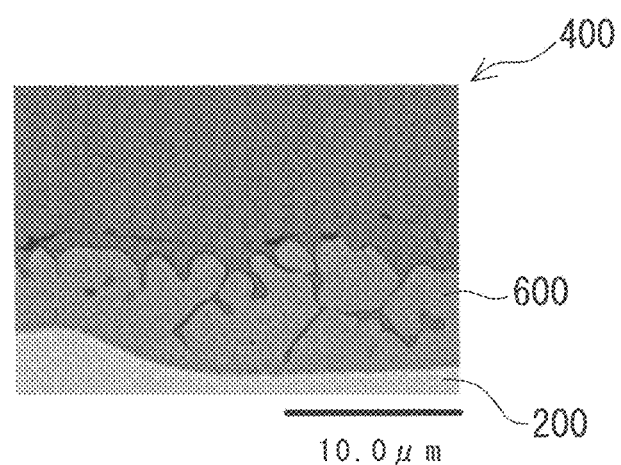
FIG. 6 is a microphotograph showing, in an enlarged manner, an area of a welded portion in the vicinity of a surface of a Cu member in a metal member-welded structure of sample No. 1-101.

In welded portion 4, a layered thick intermetallic compound 600 or an island-shaped large intermetallic compound 600 as shown in FIG. 6 (described later) does not substantially exist in the vicinity of the surface of Cu member 2 (FIG. 5). Intermetallic compound 600 is fragile $Al_2Cu$. Thus, a larger intermetallic compound 600 leads to a decrease in joining strength between Cu member 2 and Al member 3. In other words, as large intermetallic compound 600 does not substantially exist in an area of welded portion 4 in the vicinity of the surface of Cu member 2, the joining strength between Cu member 2 and Al member 3 is increased. Welded portion 4 includes sea-island structure 5 in the vicinity of the surface of Cu member 2.

<Sea-Island Structure>

As shown in FIG. 5, sea-island structure 5 includes a plurality of small island portions 51 distributed therein, and a sea portion 52 interposed among island portions 51. Due to sea-island structure 5, the stress acting on an area of welded portion 4 in the vicinity of the surface of Cu member 2 is readily distributed. This is because the surface area of each island portion 51 tends to be large in an area of welded portion 4 in the vicinity of the surface of Cu member 2, as compared with intermetallic compound 600 (FIG. 6). Thus, metal member-welded structure 1A is excellent in joining strength between Cu member 2 and Al member 3.

The thickness of sea-island structure 5 is preferably 3 μm or more, for example. When the thickness of sea-island structure 5 is 3 μm or more, the stress acting on an area of welded portion 4 in the vicinity of the surface of Cu member 2 is readily distributed. Thus, the joining strength between Cu member 2 and Al member 3 tends to be high. The thickness of sea-island structure 5 is further preferably 5 μm or more, and particularly preferably 7 μm or more. The upper limit of the thickness of sea-island structure 5 is preferably 30 μm or less, for example. Sea-island structure 5 having a thickness of 30 μm or less can suppress linear propagation of cracks. This is because sea-island structure 5 is not excessively thick, and the distance between island portions 51 is not excessively large.

The thickness of sea-island structure 5 is obtained as follows. First, the cross section of welded portion 4 is obtained. This cross section is taken as a cross section (a transverse cross section) along the direction (in the right-to-left direction in FIG. 1) orthogonal to both the thickness direction of metal member-welded structure 1A and the longitudinal direction of welded portion 4 (the vertical direction in FIG. 1). One or more fields of view for observation are taken along this cross section in the vicinity of the surface of Cu member 2. The magnification of each field of view and the size of each field of view are set such that the surface of Cu member 2 and island portion 51 furthest from the surface of Cu member 2 along the direction orthogonal to the surface of Cu member 2 are included in the same field of view. In each field of view, three or more imaginary lines orthogonal to the surface of Cu member 2 are drawn. Along each of the imaginary lines, the length between the surface of Cu member 2 and the intersection point of island portion 51 furthest from the surface of Cu member 2 on the side opposite to Cu member 2 is measured. The average of all the lengths is defined as a thickness of sea-island structure 5.

Sea-island structure 5 includes a coarse-dense structure 510 having a dense region 511 and a coarse region 512. Dense region 511 is a region where island portions 51 highly densely exist. Dense region 511 is provided on the side close to the surface of Cu member 2. Coarse region 512 is a region where island portions 51 less densely exist. Coarse region 512 is provided on the side opposite to the surface of Cu member 2. Island portions 51 in dense region 511 are relatively small in size and relatively large in number. Also, island portions 51 in coarse region 512 are relatively large in size and relatively small in number. In coarse-dense structure 510, the stress acting on an area of welded portion 4 in the vicinity of the surface of Cu member 2 is readily distributed. Thus, the joining strength between Cu member 2 and Al member 3 tends to be high. Also, island portions 51 tend to be increased in size and decreased in number from dense region 511 toward coarse region 512.

Island Portion

Island portion 51 contains pure Al. Since island portion 51 contains pure Al, the ductility of island portion 51 is relatively high. A large number of island portions 51 exist on the side close to the surface of Cu member 2. Thus, the joining strength between Cu member 2 and Al member 3 tends to be high. When Al-based material 31 is made of an Al-based alloy, island portion 51 may contain an additional element of the Al-based alloy in addition to pure Al. This additional element is preferably dissolved in pure Al. The composition of island portion 51 can be analyzed by an energy dispersive X-ray analyzer (EDX).

The size of island portion 51 is preferably 1 μm$^2$ or more and 20 μm$^2$ or less, for example. When the size of island portion 51 is 1 μm$^2$ or more, the joining strength between Cu member 2 and Al member 3 tends to be high. This is because the ductility of welded portion 4 is readily enhanced. When the size of each island portion 51 is 20 μm$^2$ or less, island portions 51 are not excessively large, and the distance between island portions 51 is less likely to be large. The size of each island portion 51 is further preferably 2 μm$^2$ or more and 15 μm$^2$ or less, and particularly preferably 3 μm$^2$ or more and 10 μm$^2$ or less.

The size of island portion 51 is an average of the areas of all island portions 51 existing in two or more fields of view in the cross section of welded portion 4. The area of each island portion 51 is calculated by commercially available image analysis software. The cross section is taken as described above. The magnification of each field of view is set at 10000 times, and the size of each field of view is set at 10 μm×10 μm in the range from the surface of Cu member 2 to 15 μm in the direction orthogonal to this surface.

The distance between island portions 51 is preferably 10 μm or less, for example. This is because the distance between island portions 51 is not excessively large, and thus, linear propagation of cracks can be suppressed. The distance between island portions 51 is further preferably 7 μm or less, and particularly preferably 5 μm or less. The lower limit of the distance between island portions 51 is 0.5 μm or more, for example. When the distance between island portions 51 is 0.5 μm or more, the distance between island portions 51 is not excessively narrow, and the stress acting on welded portion 4 is readily distributed. In particular, the stress acting on an area of welded portion 4 in the vicinity of the surface of Cu member 2 is readily distributed.

The distance between island portions 51 is obtained as described below. First, two or more fields of view for observation are taken along the cross section of welded portion 4. Then, five or more imaginary lines orthogonal to the surface of Cu member 2 are drawn for each field of view. The length between the center points of adjacent island portions 51 along each imaginary line is measured. The average of all the lengths between the center points is defined as a distance between island portions 51. The cross section and the field of view are taken in the same way as that of obtaining the size of island portion 51.

Sea Portion

Sea portion 52 is formed in a three-dimensional mesh-like shape among island portions 51. Sea portion 52 has a eutectic structure of: a phase of an intermetallic compound; and a phase of pure Al. The intermetallic compound contains Cu and Al. The intermetallic compound is representatively $Al_2Cu$. When Al-based material 31 is made of an Al-based alloy, at least one phase of the phase of the intermetallic compound and the phase of pure Al may contain an additional element of the Al-based alloy. This additional element is preferably dissolved in the phase contained therein. This eutectic structure has a lamellar shape in which the phase of the intermetallic compound and the phase of pure Al are alternately stacked. It is more preferable that the phase of the intermetallic compound and the phase of pure Al are randomly arranged so as to be stacked in various directions than that the phase of the intermetallic compound and the phase of pure Al are arranged so as to be stacked in one direction. This is because the stress acting on welded portion 4 is more readily distributed.

The thickness of sea portion 52 is preferably 5 μm or less, for example. When the thickness of sea portion 52 is 5 μm or less, sea portion 52 is relatively thin and the phase of the fragile intermetallic compound is relatively small in size. Thus, a decrease in joining strength between Cu member 2 and Al member 3 is readily suppressed. The thickness of sea portion 52 is further preferably 3 μm or less, and particularly preferably 2 μm or less.

The thickness of sea portion 52 is obtained by the method similar to that of obtaining the distance between island portions 51. Specifically, two or more fields of view for observation are taken along the cross section of welded portion 4. Five or more imaginary lines orthogonal to the surface of Cu member 2 are drawn for each field of view. The length between adjacent island portions 51 on each imaginary line is measured. The average of all the lengths is defined as a thickness of sea portion 52. The cross section and the field of view are taken in the same way as that of obtaining the size of island portion 51.

[Application]

Metal member-welded structure 1A according to the first embodiment can be suitably utilized for various types of bus bars and vehicle-mounted battery modules.

[Functions and Effects]

Metal member-welded structure 1A according to the first embodiment is excellent in joining strength between Cu member 2 and Al member 3.

[Method of Manufacturing Metal Member-Welded Structure]

A method of manufacturing a metal member-welded structure according to the first embodiment will be described as appropriate with reference to FIG. 1. The method of manufacturing a metal member-welded structure according to the first embodiment includes: preparing Cu member 2 and Al member 3 (which may be hereinafter also referred to as a preparing step); and applying laser to weld Al member 3 and Cu member 2 (which may be hereinafter also referred to as a welding step).

The method of manufacturing a metal member-welded structure has one characteristic feature of preparing Al member 3 having plating layer 32 in the preparing step, and applying laser on a specific applying condition in the welding step. This method of manufacturing a metal member-welded structure allows manufacturing of the above-described metal member-welded structure 1A. The details of each step will be hereinafter described.

[Preparing Step]

In the preparing step, Cu member 2 and Al member 3 are prepared.

(Cu Member)

Cu member 2 is formed of a Cu-based material 21 containing Cu as a main component. As described above, Cu member 2 may be formed of a covering member including Cu-based material 21 and plating layer 22. The composition, the shape, and the thickness of Cu-based material 21 are as described above. In this case, the composition of Cu-based material 21 is pure Cu. Cu-based material 21 has a plate shape. The type and the thickness of plating layer 22 are as described above. Plating layer 22 can be formed by electroplating or electroless plating.

(Al Member)

Al member 3 includes Al-based material 31 containing Al as a main component and plating layer 32. The composition, the shape, and the thickness of Al-based material 31 are as described above. In this case, the composition of Al-based material 31 is pure Al. Al-based material 31 has a plate shape. Plating layer 32 has a stack structure formed by sequentially stacking Ni plating layer 321 and Sn plating layer 322 in this order from the Al-based material 31 side (FIG. 3). Plating layer 32 may also have a single-layer structure of Ni plating layer 321 (FIG. 2). As Al member 3 includes plating layer 32, sea-island structure 5 that facilitates stress alleviation can be formed in an area of welded portion 4 in the vicinity of the surface of Cu member 2 upon laser welding in the welding step, which will be described later. Such formation of sea-island structure 5 can suppress formation of a layered thick intermetallic compound 600 and an island-shaped large intermetallic compound 600 as shown in FIG. 6 (described later) in an area of welded portion 4 in the vicinity of the surface of Cu member 2. Thus, metal member-welded structure 1A with excellent joining strength between Cu member 2 and Al member 3 can be manufactured. Plating layer 32 can be formed by electroplating or electroless plating in the same manner as that of forming plating layer 22 of Cu member 2.

[Welding Step]

In the welding step, Cu member 2 and Al member 3 are welded to each other. This welding is performed by applying laser from the Al member 3 side in the state where Cu member 2 and plating layer 32 of Al member 3 are disposed to face each other. Application of laser forms welded portion 4 obtained by melting and solidifying each of materials of Al member 3 and Cu member 2. This welded portion 4 allows production of metal member-welded structure 1A in which Al member 3 and Cu member 2 are joined to each other. When Cu member 2 has plating layer 22, plating layer 22 of Cu member 2 and plating layer 32 of Al member 3 disposed to face each other are welded.

Application of laser melts Al member 3 from its front surface to its back surface to which laser is applied, and also melts at least a part of Cu member 2 that faces the melted portion of Al member 3. Depending on the laser applying condition, the front surface and the back surface of Cu member 2 are melted in the same manner as in the case of Al member 3. In this case, welded portion 4 that has been melted and solidified penetrates through Cu member 2. When welded portion 4 penetrates through Cu member 2, it can be readily distinguished that Al member 3 and Cu member 2 are welded to each other. This is because a welding mark (not shown in the figure) is formed on the back surface of Cu member 2. It was considered that melting of Cu enough to allow penetration through Cu member 2 leads to formation of a fragile intermetallic compound ($Al_2Cu$), thereby decreasing the joining strength. However, when laser is applied on a specific applying condition to Al member 3 prepared to have plating layer 32, the size of a fragile intermetallic compound tends to be small. Thus, a decrease in joining strength can be suppressed. Therefore, even when Cu is melted so as to allow penetration through Cu member 2, metal member-welded structure 1A having the joining strength comparable to that in the case of partially melting Cu member 2 can be manufactured.

Any type of laser may be applicable as long as it can melt Al member 3 and Cu member 2 to be welded to each other. The type of the laser may include solid-state laser for which a medium is a solid. Also, the type of the laser is preferably one type selected from fiber laser, YAG laser, and $YVO_4$ laser, for example. These lasers readily allow welding between Al member 3 and Cu member 2. These lasers also include known lasers, for which mediums are doped with various materials. In other words, as to the above-mentioned fiber laser, a fiber core as its medium is doped with a rare earth element and the like. Examples of the rare earth element may be Yb and the like. As to the YAG laser, its medium may be doped with Nd, Er and the like. As to the $YVO_4$ laser, its medium may be doped with Nd and the like.

The laser applying condition can be selected as appropriate in accordance with the thickness of Al member 3 or Cu member 2, the thickness of welded portion 4, the type of the laser, and the like. It is preferable that the laser applying condition is set enough to allow penetration through Cu member 2.

The laser output is 550 W or more. When the laser output is 550 W or more, the surface of Cu member 2 can be melted, so that Al member 3 and Cu member 2 can be welded to each other. The laser output is preferably 570 W or more, and further preferably 600 W or more. Also, the laser output is preferably 850 W or less. When the laser output is 850 W or less, an excessively high output can be prevented. The laser output is further preferably 830 W or less, and particularly preferably 800 W or less.

The laser scanning rate is 10 mm/sec or more. When the laser scanning rate is 10 mm/sec or more, the productivity can be improved. This is because the scanning rate is not excessively slow, and the time required to weld Al member 3 and Cu member 2 is not excessively long. The laser scanning rate is preferably 15 mm/sec or more, and further preferably 20 mm/sec or more. The laser scanning rate is preferably 90 mm/sec or less. When the laser scanning rate is 90 mm/sec or less, the scanning rate is not excessively high, with the result that the surface of Cu member 2 can be melted. The laser scanning rate is further preferably 60 mm/sec or less, and particularly preferably 30 mm/sec or less. The laser scanning direction can be selected as appropriate. In this case, the laser scanning direction is defined as the vertical direction in FIG. 1.

It is preferable that assist gas used during laser application is nitrogen gas. It is preferable that the direction in which assist gas is applied is orthogonal to the direction in which laser is applied.

[Functions and Effects]

The method of manufacturing a metal member-welded structure according to the first embodiment allows manufacturing of metal member-welded structure 1A with excellent joining strength.

Second Embodiment

A metal member-welded structure according to the second embodiment is the same as metal member-welded structure 1A according to the first embodiment in that it includes Cu member 2, Al member 3, and welded portion 4. The metal member-welded structure according to the second embodiment is different from metal member-welded structure 1A according to the first embodiment in that Al-based material 31 of Al member 3 is made of an Al-based alloy. Specifically, the Al-based alloy is an Al—Mn alloy containing Mn as an additional element. The content of Mn is as described above. The welded portion in the metal member-welded structure has a sea-island structure in the vicinity of the surface of Cu member 2. This sea-island structure is the same as sea-island structure 5 of welded portion 4 in metal member-welded structure 1A according to the first embodiment that has been described with reference to FIG. 5. In other words, the sea-island structure includes a plurality of small island portions distributed therein, and a sea portion interposed among the island portions. These island portions each contain an additional element of an Al-based alloy in addition to pure Al. The sea portion has a eutectic structure of: a phase of an intermetallic compound; and a phase of pure Al. The intermetallic compound contains Cu and Al. At least one of the phase of the intermetallic compound and the phase of pure Al contains an additional element of the Al-based alloy.

Test Example 1

In Test Example 1, a metal member-welded structure was fabricated and its joining strength was evaluated.

[Samples No. 1-1 to No. 1-6 and No. 1-101]

The metal member-welded structure of each sample was fabricated through the preparing step and the welding step in the same manner as in the above-described method of manufacturing a metal member-welded structure.

[Preparing Step]

In the preparing step, a Cu member and an Al member were prepared. The Cu member and the Al member in each sample were combined as shown in Table 1.

(Sample No. 1-1)

As the Cu member of sample No. 1-1, a Cu-based material made of a plate member of pure Cu was prepared. The thickness of the Cu-based material was 0.3 mm. As the Al member, a covering member including an Al-based material made of a plate member of pure Al and a plating layer that covers the surface of the Al-based material was prepared. The thickness of the Al-based material was 0.6 mm. The plating layer was formed of a single-layer structure of an Ni plating layer. The thickness of the plating layer was 2 μm.

(Sample No. 1-2)

Sample No. 1-2 was the same as sample No. 1-1 except that the Al-based material was made of a different material. The Al-based material was formed of a plate member made of an Al—Mn alloy containing 1 mass % of Mn.

(Sample No. 1-3)

Sample No. 1-3 was the same as sample No. 1-1 except that the plating layer provided in the Al member was formed of a stack structure. The plating layer was formed by sequentially stacking an Ni plating layer and an Sn plating layer in this order from the Al-based material side. The thickness of the Ni plating layer and the thickness of the Sn plating layer each were 2 μm.

(Sample No. 1-4)

Sample No. 1-4 was the same as sample No. 1-1 except for the following two points.

(1) The Cu member was formed as a covering member including a Cu-based material and a plating layer that covers the surface of the Cu-based material.

(2) The plating layer provided in the Al member was formed of a stack structure.

The Cu-based material was the same as that in sample No. 1-1. The plating layer of the Cu member was formed of a single-layer structure of an Ni plating layer. The thickness of the Ni plating layer was 2 μm. The plating layer of the Al member was formed by sequentially stacking an Ni plating layer and an Sn plating layer in this order from the Al-based material side. The thickness of the Ni plating layer and the thickness of the Sn plating layer each were 2 μm.

(Sample No. 1-5)

Sample No. 1-5 was the same as sample No. 1-1 except for the following two points.

(1) The Al-based material was made of a different material.

(2) The plating layer provided in the Al member was formed of a stack structure.

The Al-based material was formed of a plate member made of an Al—Mn alloy containing 1 mass % of Mn. The plating layer of the Al member was formed by sequentially stacking an Ni plating layer and an Sn plating layer in this order from the Al-based material side. The thickness of the Ni plating layer and the thickness of the Sn plating layer each were 2 μm.

(Sample No. 1-6)

Sample No. 1-6 was the same as sample No. 1-1 except for the following two points.

(1) The Cu member was formed as a covering member including a Cu-based material and a plating layer that covers the surface of the Cu-based material.

(2) The Al-based material was made of a different material.

The Cu-based material was the same as sample No. 1-1. The plating layer of the Cu member was formed of a single-layer structure of an Ni plating layer. The thickness of the plating layer was 2 μm. The Al-based material was formed of a plate member made of an Al—Mn alloy containing 1 mass % of Mn.

(Sample No. 1-101)

Sample No. 1-101 was the same as sample No. 1-1 except that the Al member was formed only of an Al-based material. In other words, the Al member of sample No. 1-1 does not have a plating layer.

[Welding Step]

In the welding step, the Cu member and the plating layer of the Al member were disposed to face each other, to which laser was applied from the Al member side. By such application of laser, the Cu member and the Al member were welded. In the case where the Cu member had a plating layer, the plating layers were disposed to face each other and welded. Laser was applied on the conditions of outputs (W) and scanning rates (mm/sec) shown in Table 1.

[Structure Analysis]

The structure of the welded portion in the metal member-welded structure of each sample was analyzed. FIGS. 5 and 6 representatively show microphotographs of a welded portion 4 of sample No. 1-3 and a welded portion 400 of sample No. 1-101, respectively.

It was found that welded portion 4 of sample No. 1-3 had sea-island structure 5 in the vicinity of the surface of Cu member 2, as described above. It was also found that sea-island structure 5 in welded portion 4 of sample No. 1-3 had a coarse-dense structure 510 including dense region 511 and coarse region 512, as described above. Dense region 511 is a region where island portions 51 highly densely exist. Dense region 511 is provided on the side close to the surface of Cu member 2. Coarse region 512 is a region where island portions 51 less densely exist. Coarse region 512 is provided on the side opposite to the surface of Cu member 2. Although not shown, the welded portions of samples No. 1-1, No. 1-2, and No. 1-4 to No. 1-6 each had the same sea-island structure as that of the welded portion of sample No. 1-3. The thickness (μm) of the sea-island structure, the size (μm$^2$) of each of the island portions, the distance (μm) between the island portions, and the thickness (μm) of the sea portion in the welded portion of each sample were measured by the above-described measurement method. The results are shown in Table 2. It was found that the thickness of the sea-island structure of each of samples No. 1-1 to No. 1-6 was 3 μm or more, and further 5 μm or more, and particularly 7 μm or more. It was also found that the size of each of the island portions of samples No. 1-1 to No. 1-6 was 1 μm$^2$ or more and 20 μm$^2$ or less, and further 15 μm$^2$ or less, and particularly 10 μm$^2$ or less. It was found that the distance between the island portions of each of samples No. 1-1 to No. 1-6 was 10 μm or less, and further 7 μm or less, and particularly 5 μm or less. It was found that the thickness of the sea portion of each of samples No. 1-1 to No. 1-6 was 5 μm or less, and further 3 μm or less.

On the other hand, in welded portion 400 of sample No. 1-101, the sea-island structure as in sample No. 1-3 was not formed (FIG. 6). In welded portion 400 of sample No. 1-101, a layered and significantly thick intermetallic compound 600 made of Al$_2$Cu and an island-shaped and significantly large intermetallic compound 600 made of Al$_2$Cu were formed at the interface with the surface of Cu member 200.

[Evaluation of Joining Strength]

The joining strength of each sample was evaluated by measuring the maximum tensile force (N) obtained when Cu member 2 and Al member 3 were pulled (i) in the direction perpendicular to the surfaces of Cu member 2 and Al member 3 facing each other, and (ii) in the direction in which Cu member 2 and Al member 3 were away from each other. In this case, both members were pulled such that the welded portion was peeled off in the laser scanning direction (in the longitudinal direction of the welded portion). The rate at which the welded portion was peeled off was set at 50 mm/min. The result of the maximum tensile force of each sample shows: the average of the maximum tensile forces at evaluation number n=3 in each of samples No. 1-1, No. 1-2 and No. 1-101; and the average of the maximum tensile forces at evaluation number n=5 in each of samples No. 1-2 to No. 1-6. The results are shown in Table 2.

TABLE 1

| | Preparing Step | | | | | | | | Joining |
| | Cu Member | | | | Al Member | | | | Welding Step Laser Welding | | Strength Maximum |
| | Cu-Based Material | | Plating Layer | | Al-Based Material | | Plating Layer | | | | |
| Sample No. | Composition | Thickness (mm) | Material | Thickness (μm) | Composition | Thickness (mm) | Material | Thickness (μm) | Output (W) | Scanning Rate (mm/sec) | Tensile Force (N) |
|---|---|---|---|---|---|---|---|---|---|---|---|
| 1-1 | Pure Cu | 0.3 | — | — | Pure Al | 0.6 | Ni | 2 | 800 | 30 | 18.0 |
| 1-2 | Pure Cu | 0.3 | — | — | Mn: 1 Mass % | 0.6 | Ni | 2 | 800 | 30 | 19.8 |
| 1-3 | Pure Cu | 0.3 | — | — | Pure Al | 0.6 | First Layer: Ni Second Layer: Sn | First Layer: 2 Second Layer: 2 | 800 | 30 | 17.7 |
| 1-4 | Pure Cu | 0.3 | Ni | 2 | Pure Al | 0.6 | First Layer: Ni Second Layer: Sn | First Layer: 2 Second Layer: 2 | 800 | 30 | 17.3 |
| 1-5 | Pure Cu | 0.3 | — | — | Mn: 1 Mass % | 0.6 | First Layer: Ni Second Layer: Sn | First Layer: 2 Second Layer: 2 | 800 | 30 | 32.0 |
| 1-6 | Pure Cu | 0.3 | Ni | 2 | Mn: 1 Mass % | 0.6 | First Layer: Ni Second Layer: Sn | First Layer: 2 Second Layer: 2 | 800 | 30 | 18.9 |
| 1-101 | Pure Cu | 0.3 | — | — | Pure Al | 0.6 | — | — | 800 | 30 | 13.9 |

TABLE 2

| | Structure of Welded Portion Sea-Island Structure | | | | | Joining Strength |
| Sample No. | Presence or Absence | Thickness (μm) | Size of Island Portion (μm$^2$) | Distance between Island Portions (μm) | Thickness of Sea Portion (μm) | Maximum Tensile Force (N) |
|---|---|---|---|---|---|---|
| 1-1 | Presence | 8 | 2.1 | 4.5 | 3.0 | 18.0 |
| 1-2 | Presence | 12 | 2.2 | 2.3 | 1.7 | 19.8 |
| 1-3 | Presence | 15 | 1.5 | 3.2 | 1.5 | 17.7 |
| 1-4 | Presence | 10 | 1.1 | 4.4 | 2.1 | 17.3 |
| 1-5 | Presence | 17 | 3.4 | 3.1 | 1.7 | 32.0 |
| 1-6 | Presence | 11 | 2.8 | 2.1 | 1.2 | 18.9 |
| 1-101 | Absence | — | — | — | — | 13.9 |

As shown in Table 2, the maximum tensile forces of samples No. 1-1 to No. 1-6 are 1.24 times or more as high as that of sample No. 1-101. In particular, the maximum tensile force of sample No. 1-5 is twice or more as high as that of sample No. 1-101.

Thus, it turns out that the joining strength is more excellent in the metal member-welded structure obtained by welding through application of laser on the specific applying condition to an Al member prepared to have an Al-based material and a plating layer than in the metal member-welded structure obtained by application of laser only to a base material made of pure Al and not having a plating layer.

As a result of comparison between sample No. 1-1 and sample No. 1-2, comparison between sample No. 1-3 and sample No. 1-5, and comparison between sample No. 1-4 and sample No. 1-6, the following result is obtained. Specifically, sample No. 1-2, sample No. 1-5, and sample No. 1-6 each including an Al-based material made of an Al-based alloy are more excellent in joining strength than sample No. 1-1, sample No. 1-3, and sample No. 1-4, respectively, each including an Al-based material made of pure Al.

As a result of comparison between sample No. 1-3 and sample No. 1-4 and comparison between sample No. 1-5 and sample No. 1-6, the following result is obtained. Specifically, sample No. 1-3 and sample No. 1-5 each including a Cu member formed only of a Cu-based material are more excellent in joining strength than sample No. 1-4 and sample No. 1-6, respectively, each including a Cu member formed of a covering member having a Cu-based material and a plating layer.

Comparison between sample No. 1-1 and sample No. 1-3 reveals that, when the Al-based material is made of pure Al, sample No. 1-1 including a plating layer formed of a single-layer structure of an Ni plating layer is more excellent in joining strength than sample No. 1-3 having a stack structure of an Ni plating layer and an Sn plating layer. In contrast, comparison between sample No. 1-2 and sample No. 1-5 reveals that, when the Al-based material is made of an Al-based alloy, sample No. 1-5 including a plating layer formed of a stack structure of an Ni plating layer and an Sn plating layer is more excellent in joining strength than sample No. 1-2 having a single-layer structure of an Ni plating layer.

The present invention is defined by the terms of the claims, but not limited to the above illustrative description, and is intended to include any modifications within the meaning and scope equivalent to the terms of the claims.

REFERENCE SIGNS LIST

1A metal member-welded structure, 2 Cu member, 21 Cu-based material, 22 plating layer, 3 Al member, 31 Al-based material, 32 plating layer, 321 Ni plating layer, 322 Sn plating layer, 4 welded portion, 5 sea-island structure, 51 island portion, 510 coarse-dense structure, 511 dense region, 512 coarse region, 52 sea portion, 200 Cu member, 400 welded portion, 600 intermetallic compound.

The invention claimed is:

1. A metal member-welded structure comprising:
    a Cu member;
    an Al member; and
    a welded portion formed by melting and solidifying each of materials of the Cu member and the Al member, wherein
    the Cu member includes a Cu-based material,
    the Al member includes an Al-based material and a plating layer that covers a surface of the Al-based material, the surface being close to a surface of the Cu member,
    the welded portion includes a sea-island structure in a vicinity of the surface of the Cu member,
    the sea-island structure includes
        a plurality of island portions containing pure Al, and
        a sea portion interposed among the island portions, and
    the sea portion has a eutectic structure having
        a phase of an intermetallic compound of Cu and Al, and
        a phase of pure Al.

2. The metal member-welded structure according to claim 1, wherein the sea-island structure includes a dense region and a coarse region, wherein
    a size of the island portions in the dense region is smaller than a size of the island portions in the coarse region, and
    a distance between the island portions in the dense region is smaller than a distance between the island portions in the coarse region,
    the dense region is provided on a side close to the surface of the Cu member, and
    the coarse region is provided on a side opposite to the surface of the Cu member.

3. The metal member-welded structure according to claim 1, wherein the sea portion has a thickness of 5 µm or less.

4. The metal member-welded structure according to claim 1, wherein a distance between the island portions is 10 µm or less.

5. The metal member-welded structure according to claim 1, wherein the island portions each have a size of 1 µm$^2$ or more and 20 µm$^2$ or less.

6. The metal member-welded structure according to claim 1, wherein the sea-island structure has a thickness of 3 µm or more.

7. The metal member-welded structure according to claim 1, wherein the Al-based material contains, as an additional element, one or more elements selected from: 1 mass % or more and 17 mass % or less of Si; 0.05 mass % or more and 2.5 mass % or less of Fe; 0.05 mass % or more and 2.5 mass % or less of Mn; and 0.1 mass % or more and 1.0 mass % or less of Mg.

8. The metal member-welded structure according to claim 1, wherein the plating layer has a single-layer structure of an Ni plating layer.

9. The metal member-welded structure according to claim 1, wherein the plating layer has a stack structure formed by sequentially stacking an Ni plating layer and an Sn plating layer from an Al-based material side.

10. The metal member-welded structure according to claim 1, wherein the Cu member includes a plating layer that covers a surface of the Cu-based material.

11. The metal member-welded structure according to claim 1, wherein the welded portion penetrates through the Cu member.

* * * * *